US010863090B2

(12) United States Patent
Kogure (10) Patent No.: US 10,863,090 B2
(45) Date of Patent: Dec. 8, 2020

(54) CONTROL APPARATUS, IMAGE CAPTURING APPARATUS, CONTROL METHOD, AND COMPUTER-READABLE STORAGE MEDIUM (71) Applicant: CANON KABUSHIKI KAISHA, Tokyo (JP)

(72) Inventor: Kentaro Kogure, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/161,251

(22) Filed: Oct. 16, 2018

(65) Prior Publication Data
US 2019/0124264 A1  Apr. 25, 2019

(30) Foreign Application Priority Data
Oct. 24, 2017 (JP) .................................. 2017-205546

(51) Int. Cl.
H04N 5/232 (2006.01)
G06T 1/00 (2006.01)
H04N 5/235 (2006.01)

(52) U.S. Cl.
CPC ....... H04N 5/23261 (2013.01); G06T 1/0007 (2013.01); H04N 5/2353 (2013.01); H04N 5/23254 (2013.01); H04N 5/23296 (2013.01); H04N 5/23299 (2018.08)

(58) Field of Classification Search
CPC .............................................. H04N 5/23261
USPC ..................................................... 348/208.5
See application file for complete search history.

(56) References Cited

U.S. PATENT DOCUMENTS

| 8,508,804 B2 | 8/2013 | Watanabe |
| 9,185,281 B2 | 11/2015 | Takizawa |
| 9,204,058 B2 | 12/2015 | Hjelmstrom |
| 10,560,624 B2 | 2/2020 | Oshima et al. |
| 2002/0051057 A1* | 5/2002 | Yata ............... G01S 3/7864 348/142 |
| 2005/0162540 A1 | 7/2005 | Yata |
| 2011/0102850 A1 | 5/2011 | Watanabe |
| 2012/0218378 A1 | 8/2012 | Takizawa |
| 2013/0063605 A1 | 3/2013 | Guan |
| 2015/0002732 A1 | 1/2015 | Hjelmstrom |
| 2017/0163881 A1 | 6/2017 | Oshima et al. |

FOREIGN PATENT DOCUMENTS

| CN | 102069633 A | 5/2011 |
| CN | 102771121 A | 11/2012 |
| CN | 104253949 A | 12/2014 |
| CN | 105847662 A | 8/2016 |
| CN | 105898143 A | 8/2016 |

(Continued)

OTHER PUBLICATIONS

Jun. 2, 2020 Chinese Official Action in Chinese Patent Appln. No. 201811212639.0.

Primary Examiner — Joel W Fosselman
(74) Attorney, Agent, or Firm — Venable LLP (57) ABSTRACT A control apparatus obtains the moving speed of an object, and controls, based on the moving speed of the object, an image capturing unit configured to capture the object such that first image capturing for performing image capturing without following the object or second image capturing for performing image capturing while following the object is performed.

17 Claims, 8 Drawing Sheets (56) References Cited

FOREIGN PATENT DOCUMENTS

| | | | |
|---|---|---|---|
| CN | 106254783 | A | 12/2016 |
| CN | 106303223 | A | 1/2017 |
| CN | 106331511 | A | 1/2017 |
| CN | 106688228 | A | 5/2017 |
| JP | 2011-041186 | A | 2/2011 |
| JP | 2014-206640 | A | 10/2014 |

\* cited by examiner

| MOVING SPEED OF OBJECT | EXPOSURE PERIOD |
|---|---|
| 10 | 1/250 |
| 25 | 1/500 |
| 50 | 1/1000 |
| 100 | 1/2000 |
| 200 | 1/4000 |

FIG. 7

| NOISE AMOUNT | BRIGHTNESS | EXPOSURE PERIOD |
|---|---|---|
| 5 | 100 | 1/30 |
| 10 | 80 | 1/15 |
| 15 | 60 | 1/8 |
| 20 | 40 | 1/4 |
| 25 | 20 | 1/2 |

CONTROL APPARATUS, IMAGE CAPTURING APPARATUS, CONTROL METHOD, AND COMPUTER-READABLE STORAGE MEDIUM

BACKGROUND OF THE INVENTION

Field of the Invention

The present invention relates to an adaptive setting technique upon image capturing of an object.

Description of the Related Art

In recent years, many monitoring cameras capable of selecting an arbitrary image capturing direction by panning (driving in the horizontal direction), tilting (driving in the vertical direction), and zooming are used. In addition, as a type of such monitoring cameras, monitoring cameras capable of performing image capturing while turning by 360° panning and 180° tilting increase. In monitoring, to determine the characteristic of a person who runs away, a car that drives off, or the like from an image, it is important to clearly capture the object (to be referred to as a "moving object" hereinafter) that moves. On the other hand, Japanese Patent Laid-Open No. 2011-041186 describes an automatic exposure control technique of calculating the moving speed of a moving object and changing the exposure period in accordance with the calculated moving speed, thereby clearly capturing the moving object.

In the technique described in Japanese Patent Laid-Open No. 2011-041186, the exposure period is set short when capturing a moving object that moves at a high speed. However, if the exposure period of automatic exposure control is shortened to capture a moving object that moves at a high speed under a low illumination, a captured image of poor visibility with a low brightness and much noise may be obtained because of a shortage of sensitivity, and it may be impossible to clearly capture the moving object.

SUMMARY OF THE INVENTION

The present invention provides a technique for setting an appropriate image capturing method in accordance with an image capturing condition.

According to one aspect of the present invention, there is provided a control apparatus comprising: an obtaining unit configured to obtain a moving speed of an object; and a control unit configured to control, based on the moving speed of the object, an image capturing unit configured to capture the object such that first image capturing for performing image capturing without following the object or second image capturing for performing image capturing while following the object is performed.

According to another aspect of the present invention, there is provided a control apparatus comprising: an identifying unit configured to identify, based on at least a moving speed of an object, whether a predetermined condition concerning image quality can be satisfied by first image capturing for performing image capturing without following the object by an image capturing unit; and a control unit configured to, when it is identified that the predetermined condition cannot be satisfied by the first image capturing, perform control to perform panning, tilting, or both panning and tilting of the image capturing unit such that second image capturing for capturing the object while following the object by the image capturing unit is performed.

According to still another aspect of the present invention, there is provided an image capturing apparatus comprising an image capturing unit configured to capture an object a moving speed of an object, and a control apparatus, wherein the control apparatus comprises: an obtaining unit configured to obtain a moving speed of the object; and a control unit configured to control, based on the moving speed of the object, the image capturing unit such that first image capturing for performing image capturing without following the object or second image capturing for performing image capturing while following the object is performed.

According to yet another aspect of the present invention, there is provided an image capturing apparatus comprising an image capturing unit, and a control apparatus, wherein the control apparatus comprises: an identifying unit configured to identify, based on at least a moving speed of an object, whether a predetermined condition concerning image quality can be satisfied by first image capturing for performing image capturing without following the object by the image capturing unit; and a control unit configured to, when it is identified that the predetermined condition cannot be satisfied by the first image capturing, perform control to perform panning, tilting, or both panning and tilting of the image capturing unit such that second image capturing for capturing the object while following the object by the image capturing unit is performed.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

In the following embodiments, a case in which a camera that captures a still image is used will be described. However, for example, a camera that captures a moving image may be used, or another arbitrary image capturing apparatus may be used. Note that the camera can be a digital still camera or a digital video camera.

First Embodiment (Arrangement of Camera)

Figure 1:
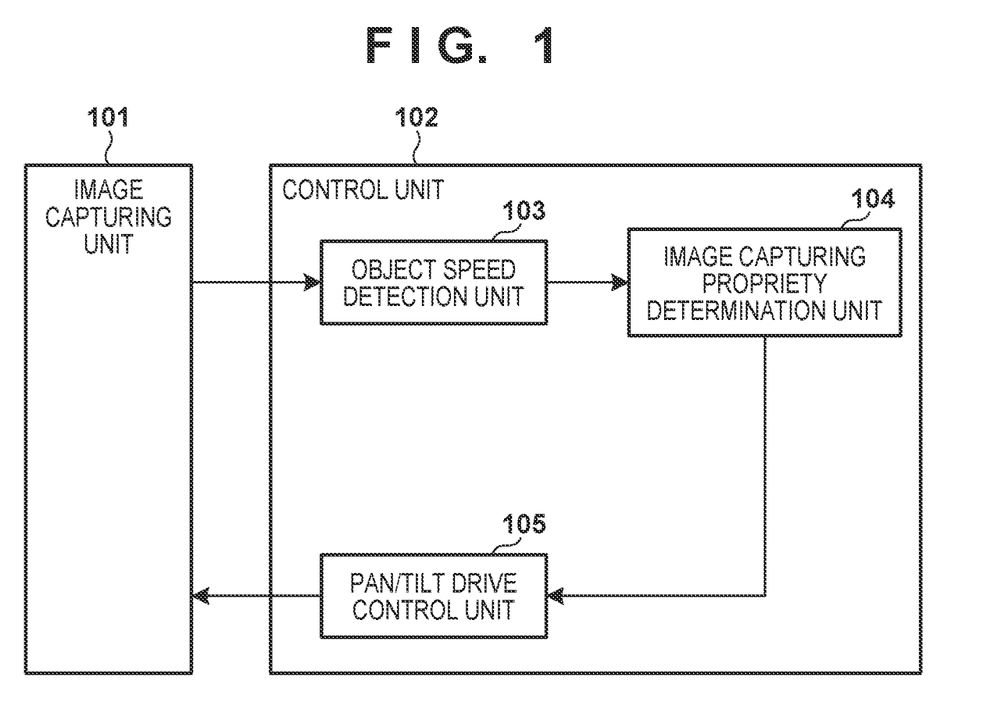
FIG. 1 is a block diagram showing the first arrangement example of a camera.
Figure 11:
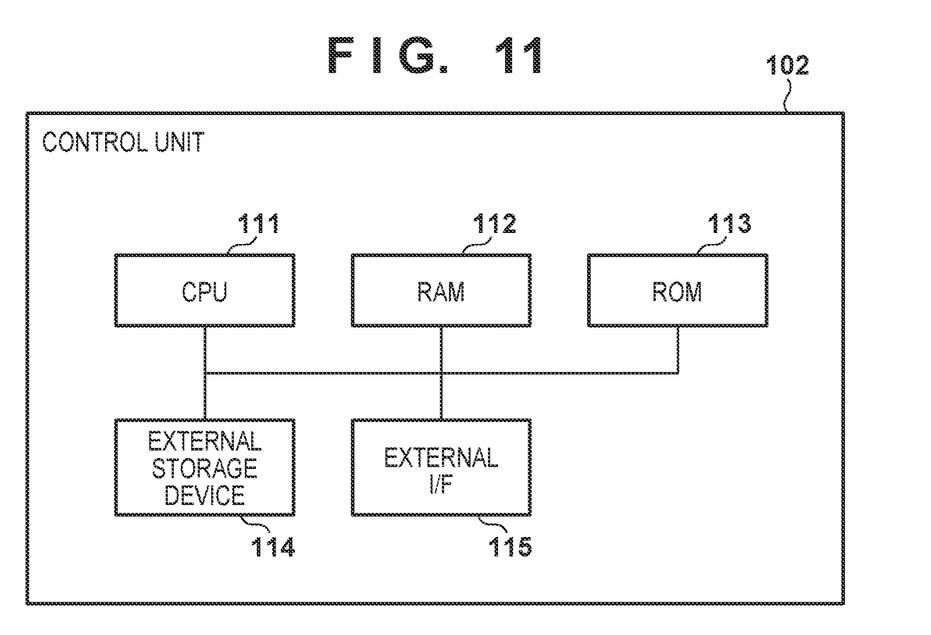
FIG. 11 is a block diagram showing a hardware arrangement example of a control unit.

FIG. 1 shows the arrangement of a camera according to this embodiment. In the camera, an image capturing unit 101 receives external light and performs image capturing. The image capturing unit 101 is connected to a control unit 102 and configured to be able to output a captured image to the control unit 102 and change the settings such as an image capturing range (pan/tilt/zoom) and an exposure period under the control of the control unit 102. The control unit 102 receives, from the image capturing unit 101, input of an image captured by the image capturing unit 101 and controls the image capturing unit 101. The control unit 102 can be, for example, a control device including a processor such as a CPU or an MPU and a storage device such as a memory. FIG. 11 shows an example of the hardware arrangement of the control unit 102 in this case. The control unit 102 includes, for example, a CPU 111, a RAM 112, a ROM 113, an external storage device 114, and an external I/F 115. In an example, the CPU 111 executes a program stored in the ROM 113 or the external storage device 114 using the RAM 112 as a work memory, thereby executing processing by the control unit 102 to be described later. Note that the control unit 102 can communicably be connected to the image capturing unit 101 via the external I/F 115.

Figure 2:
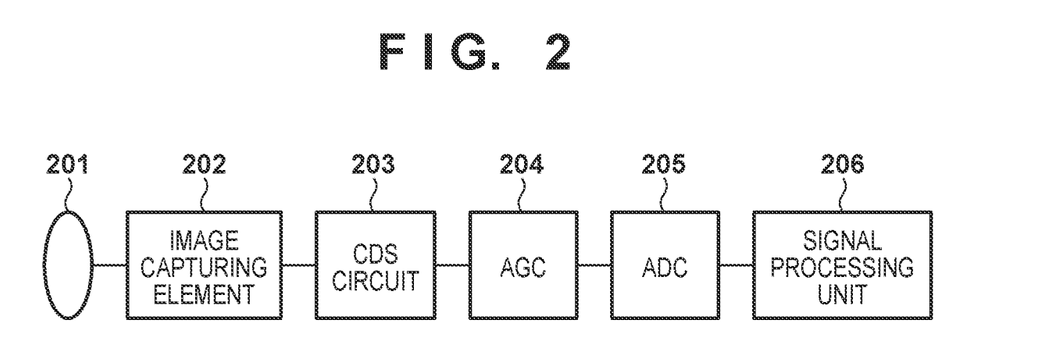
FIG. 2 is a block diagram showing an arrangement example of the image capturing unit 101 of the camera.

In an example, the image capturing unit 101 has the arrangement as shown in FIG. 2. The image capturing unit 101 includes a lens 201 that forms an optical system including several lenses, and an image capturing element 202 such as a CCD or a CMOS. In addition, the image capturing unit 101 includes a CDS (Correlated Double Sampling) circuit 203 that reduces noise, and an AGC (Automatic Gain Control) amplifier 204 that automatically controls the gain of the camera. The image capturing unit 101 also includes an ADC (Analog/Digital Converter) 205 that converts an analog signal into a digital signal, and a signal processing unit 206 that performs signal processing for the digital signal. In the image capturing unit 101, the image capturing element 202 converts an object image formed via the lens 201 into an electrical signal. The CDS circuit 203 then executes correlated double sampling or the like for the electrical signal output from the image capturing element 202, and the AGC amplifier 204 performs amplification processing or the like for the electrical signal output from the CDS circuit 203. The ADC 205 converts the analog signal amplified by the AGC amplifier 204 into a digital signal. The signal processing unit 206 performs, for the digital signal obtained from the ADC 205, predetermined signal processing, for example, image processing such as color conversion, WB processing, and gamma processing for performing tone conversion of the image that has undergone the signal processing.

The control unit 102 includes, as its functions, an object speed detection unit 103, an image capturing propriety determination unit 104, and a pan/tilt drive control unit 105. These functional units can be implemented by, for example, executing a program stored in the memory or the like in the control unit 102 by the processor in the control unit 102. Note that some or all of the functional units may be implemented by hardware such as a dedicated circuit. That is, the control unit 102 may be an aggregate of pieces of dedicated hardware. For example, as the control unit 102, an FPGA (Field Programmable Gate Array) in which the functions of some or all of the above-described functional units are implemented by a predetermined program may be used.

The object speed detection unit 103 detects the moving speed of an object from an image captured by the image capturing unit 101. The image capturing propriety determination unit 104 determines, based on the moving speed of the object detected by the object speed detection unit 103, whether the object can be captured while satisfying a predetermined condition concerning quality (image quality or video quality) in a state in which the image capturing range of the image capturing unit 101 is fixed. Based on the determination result of the image capturing propriety determination unit 104, the pan/tilt drive control unit 105 generates a drive signal for causing the image capturing unit 101 to perform panning, tilting, or both panning and tilting, and controls the image capturing unit 101 based on the drive signal.

(Procedure of Processing)

Figure 3:
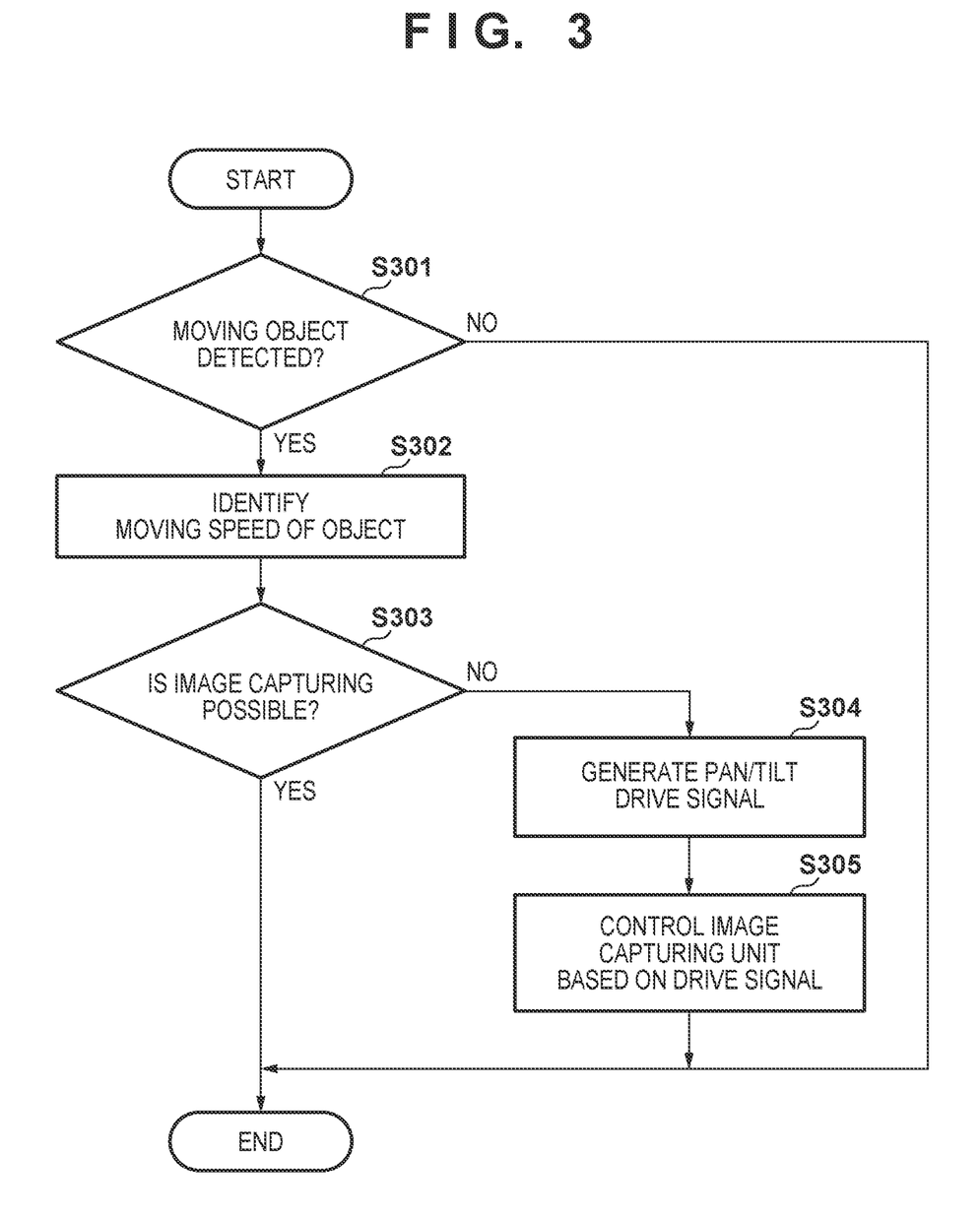
FIG. 3 is a flowchart showing the first example of the procedure of processing.

The procedure of processing executed by the image capturing unit 101 and the control unit 102 according to this embodiment will be described next with reference to FIG. 3.

First, the image capturing unit 101 obtains an image by periodical first image capturing using predetermined settings concerning, for example, the exposure period, the image capturing range, and the like, and the control unit 102 executes determination processing of determining whether a moving object is included in the image (step S301). For example, the control unit 102 can detect recognize only a specific object as a moving object by characteristic amount extraction or pattern recognition. Note that the specific object may be designated by, for example, receiving an object selection result by a user operation or may be designated by another method. For example, when an object passes through a predetermined position in the image or enters a predetermined region, the control unit 102 may designate the object as a specific moving object. If a moving object is not detected (NO in step S301), the control unit 102 directly continues the image capturing without executing subsequent processing. On the other hand, upon detecting a moving object (YES in step S301), the control unit 102 calculates the moving speed of the moving object (step S302). For example, the control unit 102 can identify the motion vector and the moving direction of the moving object from a plurality of temporally continuously captured images. The control unit 102 can identify the moving speed of the moving object based on, for example, the norm of the motion vector. Note that the control unit 102 may identify the moving speed of the moving object by a method other than these.

Next, the control unit 102 determines, based on the moving speed of the moving object identified in step S302, whether the target object can be captured by first image capturing using the image capturing condition that was used in step S301 while satisfying a predetermined condition concerning quality (image quality or video quality) (step S303). For example, if the moving speed of the moving object identified in step S302 is equal to or lower than a predetermined threshold, the control unit 102 determines that the object can be captured while satisfying the predetermined condition. On the other hand, if the moving speed exceeds the predetermined threshold, the control unit 102 determines that the object cannot be captured while satisfying the predetermined condition. At this time, the predetermined threshold may be a fixed value or may be a variation value that can be changed by, for example, a setting by the user or the like. Alternatively, the control unit 102 may determine, based on the relationship between the moving speed and the exposure period of the image capturing unit 101, whether the object can be captured while satisfying the predetermined condition. For example, the control unit 102 can determine whether the moving object can be captured without an image blur by determining whether the moving speed of the moving object exceeds the above-described threshold determined by the current exposure period.

Upon determining that the object can be captured by the first image capturing while satisfying the predetermined condition (YES in step S303), the control unit 102 directly continues the image capturing without executing subsequent processing. On the other hand, upon determining that the object cannot be captured by the first image capturing while satisfying the predetermined condition (NO in step S303), the control unit 102 generates a pan/tilt drive signal to capture the object while satisfying the predetermined condition (step S304). For example, the control unit 102 generates a pan/tilt drive signal for moving the image capturing range of the image capturing unit 101 so as to execute panning shot along with the movement of the object, in other words, fix the moving object at a predetermined position in the image capturing range during the exposure period. That is, the control unit 102 generates a pan/tilt drive signal to make the image capturing range of the image capturing unit 101 follow the moving object. Hence, the higher the moving speed of the moving object is, the higher the signal level of the generated pan/tilt drive signal is to do panning or tilting at a high speed. Note that the generation method and the contents of the pan/tilt drive signal are not particularly limited as long as the pan/tilt drive signal to perform such follow-up control to the moving object is generated. After that, the control unit 102 performs second image capturing while performing drive control of panning or tilting of the image capturing unit 101 in accordance with the generated pan/tilt drive signal (step S305).

As described above, in this embodiment, the control unit 102 performs control to directly continue the first image capturing for an object that has a sufficiently low moving speed and can be captured by the first image capturing while satisfying a predetermined condition. On the other hand, for an object that has a high moving speed and cannot be captured by the first image capturing while satisfying a predetermined condition, the control unit 102 performs second image capturing of capturing the object while following it by pan/tilt control. Accordingly, the object can be captured with high quality. In addition, since the image capturing is performed by following the object, instead of shortening the exposure period for the moving object that is moving at a high speed, it is possible to improve the probability that a captured image of excellent visibility can be obtained.

Second Embodiment

In the above-described first embodiment, an example in which the camera sets a predetermined exposure period and the like and decides, in accordance with the moving speed of a moving object, whether to perform pan/tilt control has been described. In this embodiment, an example in which a camera further sets an exposure period in accordance with the moving speed of a moving object will be described.

(Arrangement of Camera)

Figure 4:
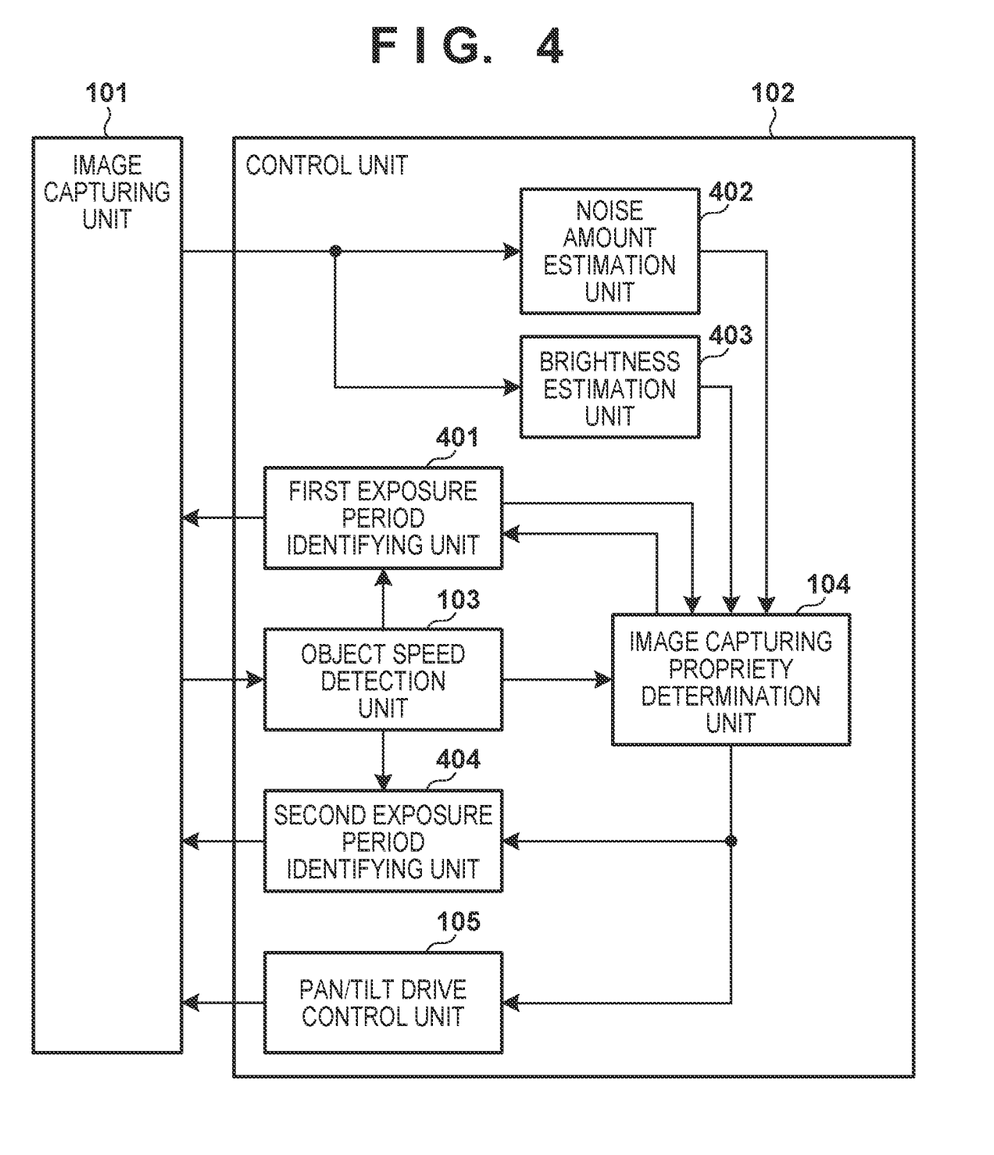
FIG. 4 is a block diagram showing the second arrangement example of a camera.

FIG. 4 shows an arrangement example of a camera according to this embodiment. The camera according to this embodiment is the same as in FIG. 1 in that it includes an image capturing unit 101 and a control unit 102. However, the control unit 102 according to this embodiment implements a first exposure period identifying unit 401, a noise amount estimation unit 402, brightness estimation unit 403, and a second exposure period identifying unit 404 as additional functions. Note that the reference numerals common to those in FIG. 1 denote the same functional blocks in FIG. 4, and a description thereof will be omitted.

The first exposure period identifying unit 401 identifies an exposure period capable of performing image capturing without an image blur by, for example, calculation in correspondence with the object speed. The noise amount estimation unit 402 estimates the noise amount of an image in a case in which the current exposure is maintained by automatic exposure when the first exposure period identified by the first exposure period identifying unit 401 is set, and the gain is increased by an AGC amplifier 204 of the image capturing unit 101. The brightness estimation unit 403 estimates the brightness of the image in a case in which automatic exposure control is performed when the first exposure period identified by the first exposure period identifying unit 401 is set. The second exposure period identifying unit 404 identifies, by, for example, calculation, the second exposure period suitable for image capturing under a condition that it is determined that the object cannot be captured while satisfying a predetermined condition, and pan/tilt drive following the moving object is performed.

(Procedure of Processing)

Figure 5:
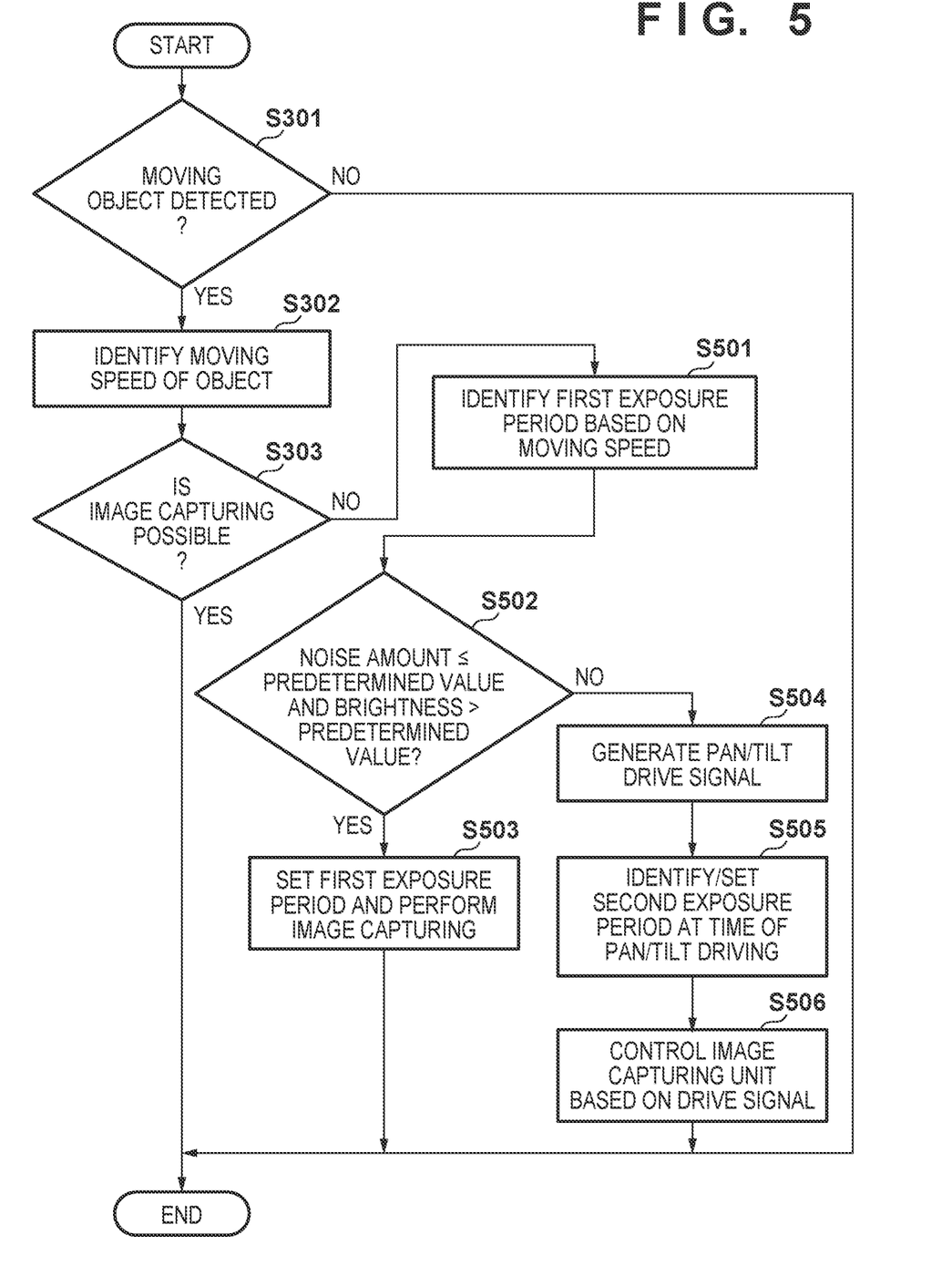
FIG. 5 is a flowchart showing the second example of the procedure of processing.

The procedure of processing executed by the image capturing unit 101 and the control unit 102 according to this embodiment will be described next with reference to FIG. 5. Note that the step numbers common to those in FIG. 3 denote the same processing steps in FIG. 5, and a description thereof will be omitted.

Figure 6:
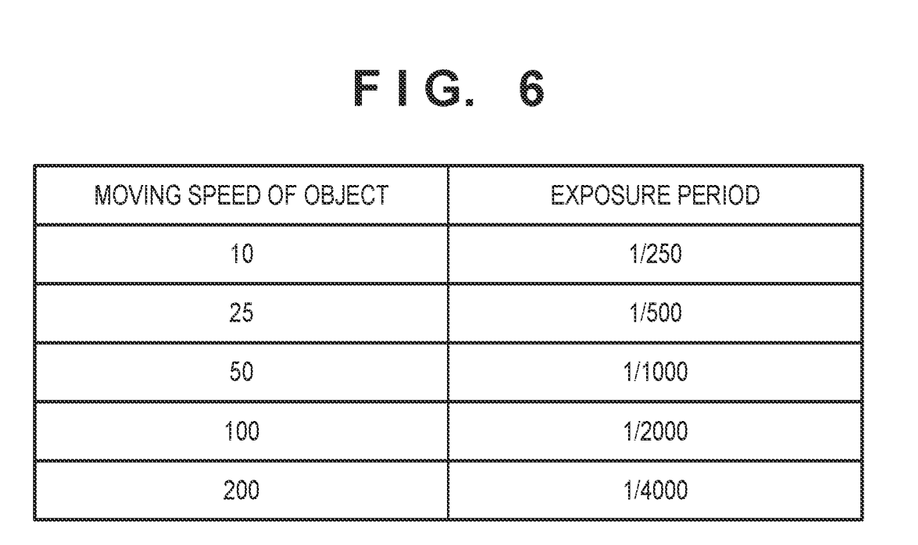
FIG. 6 is a view showing an example of the correspondence relationship between an object speed and an exposure period.

In this processing, if the image capturing unit 101 cannot capture an object by first image capturing using the current exposure period while satisfying a predetermined condition (NO in step S303), the control unit 102 identifies the first exposure period that enables the image capturing unit 101 to capture the moving object without an image blur (step S501). The control unit 102 can identify, for example, a period necessary for the moving object to move by a predetermined distance (for example, 0.05 m) as the first exposure period. At this time, the control unit 102 can hold numerical values settable as the exposure period in the image capturing unit 101 and identify, as the first exposure period, a maximum settable exposure period equal to or less than the exposure period calculated based on the moving speed. Alternatively, the control unit 102 can hold, for example, a table of exposure periods, as shown in FIG. 6, capable of capturing an object without an image blur in correspondence with the moving speeds of the object in advance and identify the first exposure period by looking up the table. At this time, for example, in a case in which the moving speed of the object is 10 m/sec or less, the control unit 102 sets the exposure period to $1/250$ sec in accordance with the table shown in FIG. 6. In addition, for example, in a case in which the moving speed of the object is more than 10 m/sec and not more than 25 m/sec, the control unit 102 sets the exposure period to ⅟500 sec.

Figure 7:
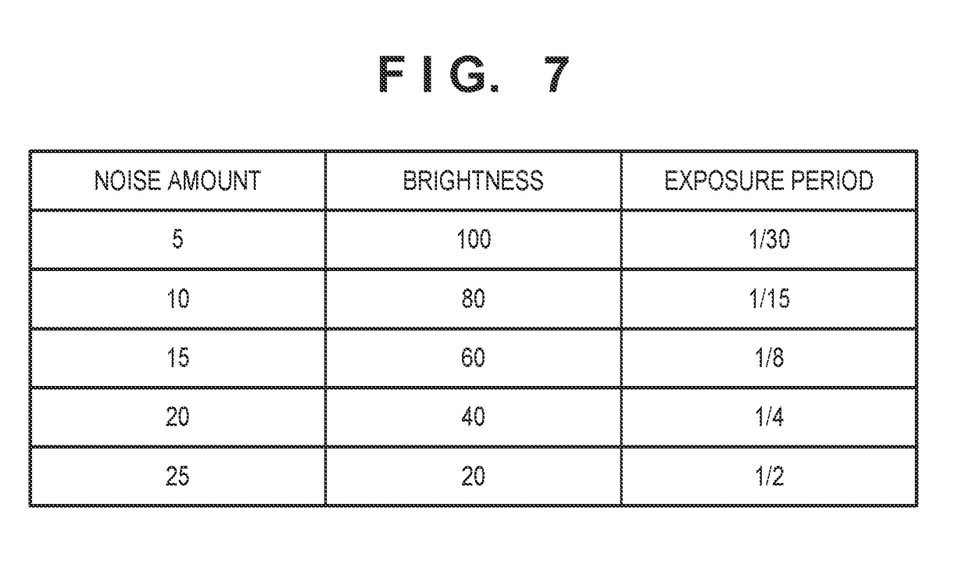
FIG. 7 is a view showing an example of the correspondence relationship between noise of an image, the numerical value of brightness, and the exposure period in a case in which the exposure period shown in FIG. 6 is set.

The control unit 102 estimates the noise amount and the brightness of the image in a case in which third image capturing is performed by setting the first exposure period identified in step S501 and using automatic exposure control, and determines whether the noise amount is a predetermined value or less and whether the brightness exceeds a predetermined value (step S502). The noise amount can be estimated based on an S/N ratio obtained from the average brightness and the standard deviation of a part or the whole of the image. The control unit 102 may estimate the noise amount in consideration of the value of the current gain of the AGC amplifier 204 of the image capturing unit 101, the temperature of an image capturing element 202, the level of image processing (noise reduction, sharpness, and chroma), and the like. The brightness is identified based on the brightness or average brightness of a part of the image. If the noise amount is, for example, not more than a predetermined threshold capable of recognizing the moving object, and the brightness is, for example, more than a predetermined threshold capable of recognizing the moving object (YES in step S502), the control unit 102 sets the image capturing unit 101 such that the third image capturing is performed using the first exposure period (step S503). On the other hand, if the noise amount exceeds the above-described predetermined threshold, or the brightness is the predetermined threshold or less (NO in step S502), the control unit 102 generates a pan/tilt drive signal to suppress the noise amount and capture the moving object with a sufficient brightness (step S504). The pan/tilt drive signal is generated as in step S304 of FIG. 3. Next, the control unit 102 decides the second exposure period to be set when moving the image capturing range of the image capturing unit 101 by the pan/tilt drive signal generated in step S504 and sets the image capturing unit 101 (step S505). The second exposure period can be set longer than the first exposure period decided in step S501. The control unit 102 can prepare, for example, a table of exposure periods, as shown in FIG. 7, corresponding to the noise amount and/or the estimated brightness and decide the value of the second exposure period based on the table. For example, the control unit 102 can set a longer one of the exposure period corresponding to the noise amount and the exposure period corresponding to the brightness as the second exposure period. Alternatively, the control unit 102 may hold numerical values settable as the exposure period in the image capturing unit 101 and identify, as the second exposure period, a maximum settable exposure period equal to or less than the exposure period calculated based on the moving speed. After that, the control unit 102 executes fourth image capturing using the second exposure period while moving the image capturing range of the image capturing unit 101 based on the pan/tilt drive signal generated in step S504 (step S506).

Note that in the above description, both the noise amount and the brightness are estimated, and it is determined whether to perform image capturing using the first exposure period. However, this determination may be done based on only one of the noise amount and the brightness. That is, the third image capturing using the first exposure period may be performed in a case in which the noise amount is a predetermined value or less, independently of the brightness value, or the third image capturing using the first exposure period may be performed in a case in which the brightness value is a predetermined value or less, independently of the noise amount.

As described above, in this embodiment, for a moving object with a low moving speed, the first exposure period corresponding to the moving speed is set first. Then, the noise amount and the brightness in image capturing using the first exposure period are estimated, it is determined whether the moving object can be captured while satisfying a predetermined condition, pan/tilt control is executed as needed, and the exposure period is newly set to the second exposure period. This makes it possible to set an appropriate exposure period in accordance with the environment such as an illumination and execute pan/tilt control as needed to clearly capture the moving object. That is, under a high illumination, the moving object is captured using the first exposure period without executing pan/tilt control. This is because if the illumination is sufficient, the moving object can clearly be captured using a short exposure period without executing pan/tilt control. On the other hand, under a low illumination, the moving object is captured while executing pan/tilt control. The moving object can thus be captured with a small noise amount and sufficient brightness.

Note that the setting of the first exposure period and the third image capturing need not be performed in actuality. For example, the control unit 102 obtains information such as the brightness and the noise amount in advance by image capturing under predetermined settings such as initial settings used when detecting the moving object. Then, the control unit 102 can estimate the brightness and the noise amount in a case in which the exposure period is assumed to be changed to the first exposure period in accordance with the speed of the moving object based on the brightness or noise amount obtained in advance and the above-described predetermined settings. That is, the noise amount and the brightness in a case in which the first exposure period is used can be estimated without actually using the first exposure period.

Third Embodiment

In the above-described embodiments, an arrangement in which a moving object is captured using one image capturing apparatus has been described. In this embodiment, an example in which a moving object is captured using two or more image capturing apparatuses will be described.

(Arrangement of System)

Figure 8:
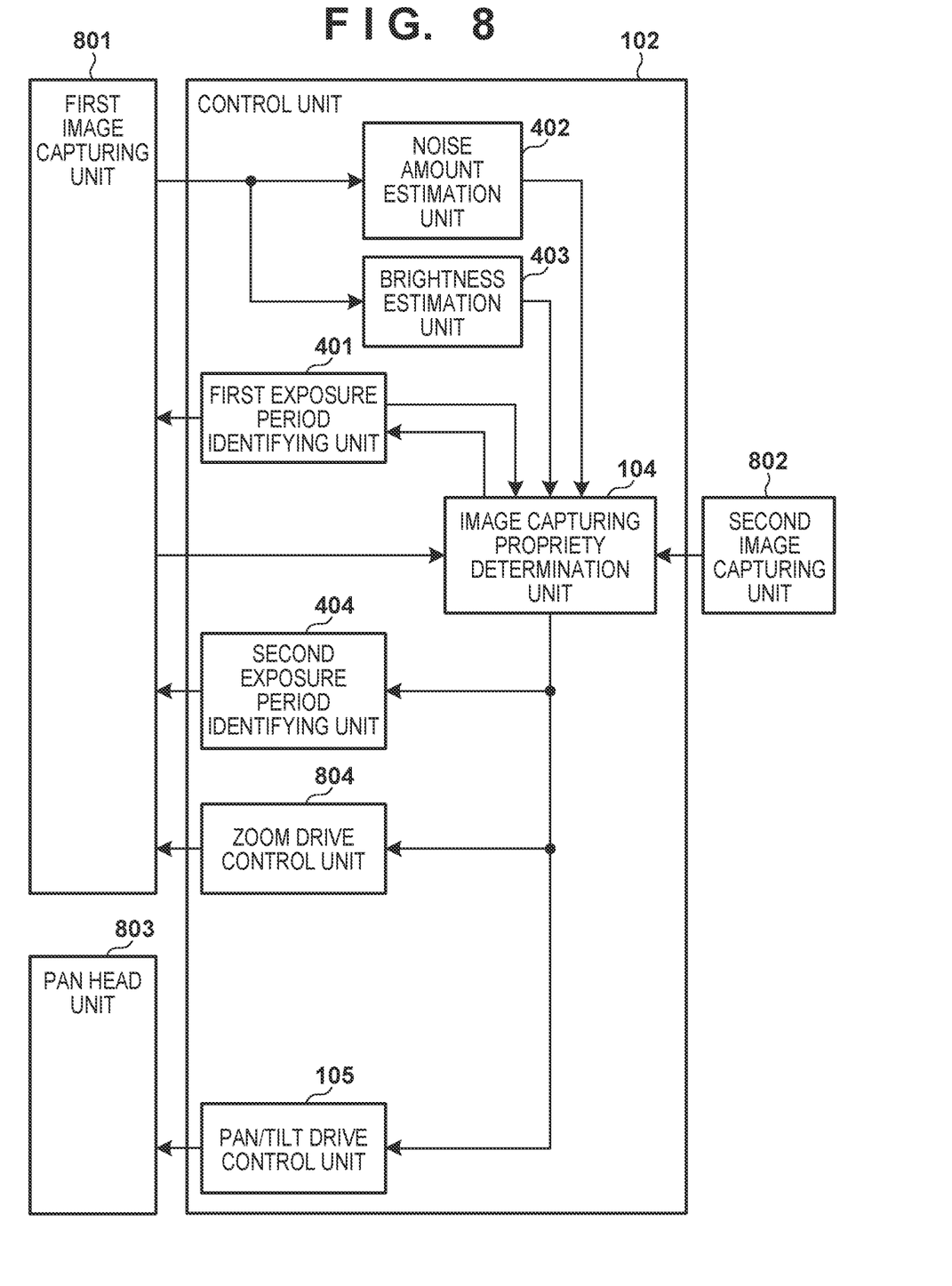
FIG. 8 is a block diagram showing the third arrangement example of a camera.

FIG. 8 shows an arrangement example of a system including a camera according to this embodiment. The system according to this embodiment includes a first image capturing unit 801, a second image capturing unit 802, and a pan head unit 803. The first image capturing unit 801 and the second image capturing unit 802 can have a common arrangement as shown in FIG. 2. In addition, the first image capturing unit 801 and the second image capturing unit 802 can be, for example, image capturing apparatuses capable of capturing only a predetermined direction. For this reason, the first image capturing unit 801 is different from the image capturing unit 101 in that, for example, it is panned or tilted by the pan head unit 803 to which the first image capturing unit 801 is attached. Hence, in this embodiment, a control unit 102 controls not the first image capturing unit 801 but the pan head unit 803 via a pan/tilt drive control unit 105 and thus implements panning or tilting of the first image capturing unit 801. Note that panning or tilting of the image capturing unit 101 according to the above-described first and second embodiments may also be controlled by the pan head unit 803 as in this embodiment.

Figure 10:
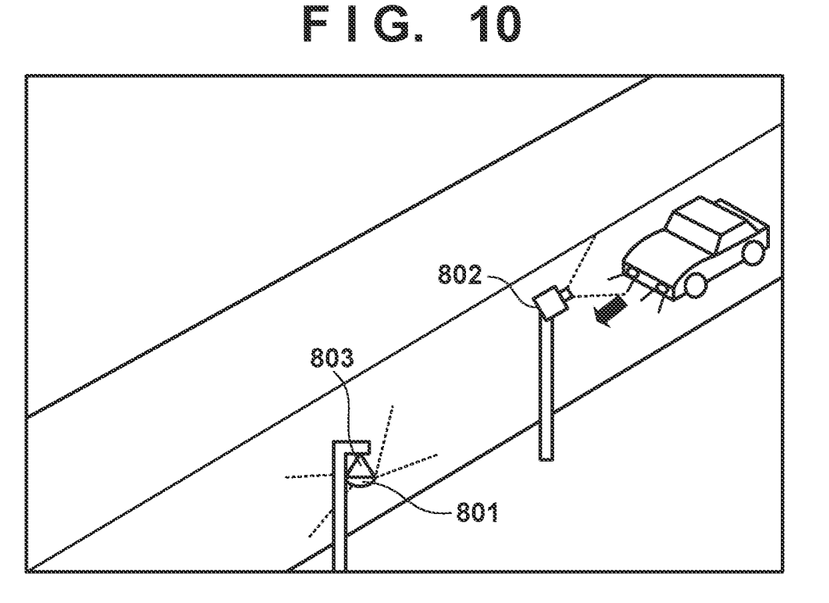
FIG. 10 is a view showing an example of the arrangement of a first image capturing unit, a pan head, and a second image capturing unit.

In this embodiment, the control unit 102 executes processing such as detection of a moving object based on image capturing by the second image capturing unit 802 and controls the first image capturing unit 801 and the pan head unit 803 in accordance with the result. Here, the moving object captured by the second image capturing unit 802 is assumed to then move into the image capturing range of the first image capturing unit 801. Such a situation can occur in a structure in which, for example, the moving object needs to pass through the image capturing range of the first image capturing unit 801 to get out of the position where the second image capturing unit 802 is arranged in a building to the outside. Such a situation can also occur in a case in which the second image capturing unit 802 and the first image capturing unit 801 are arranged at a field angle of image capturing in an image capturing direction to capture a vehicle that travels on a one-way road, as shown in, for example, FIG. 10.

Note that each of the first image capturing unit 801 and the second image capturing unit 802 need not always include one image capturing unit. For example, when a moving object is detected by one of a plurality of second image capturing units 802 arranged around one first image capturing unit 801, the one first image capturing unit 801 and the corresponding pan head unit 803 may be controlled. Alternatively, when a moving object is detected by one second image capturing unit 802, a plurality of first image capturing units 801 and pan head units 803 existing around the second image capturing unit 802 may be controlled. In addition, the second image capturing unit 802 may be replaced with another device configured to detect the speed of a moving body using an electromagnetic wave or the like.

In a normal state, the second image capturing unit 802 performs image capturing, for example, periodically and, upon detecting a moving object, transmits information concerning the moving object such as the object speed, the moving direction, and the characteristic amount of the moving object to the control unit 102 (image capturing propriety determination unit 104). Note that the second image capturing unit 802 may input an image obtained by image capturing to the control unit 102, and the control unit 102 may detect the moving object and identify the object speed, the moving direction, and the characteristic amount of the moving object. The control unit 102 controls the first image capturing unit 801 and the pan head unit 803 based on the information obtained from the second image capturing unit 802. Note that the control unit 102 is different from that of each of the above-described embodiments in that a pan/tilt drive control unit 105 controls the pan head unit 803, and a zoom drive control unit 804 controls the first image capturing unit 801. Here, the zoom drive control unit 804 generates a drive signal used to change the zoom magnification of a lens 201 of the first image capturing unit 801 and controls zooming of the lens 201 of the first image capturing unit 801 in accordance with the drive signal. Note that in the first and second embodiments, zooming control of the image capturing unit 101 has not particularly been mentioned. However, zooming control of the image capturing unit 101 may be performed as in this embodiment. For example, in the first and second embodiments, zooming control can be performed such that the moving object is captured in a size that enables discrimination of the moving object and grasping of the entire image.

(Procedure of Processing)

Figure 9:
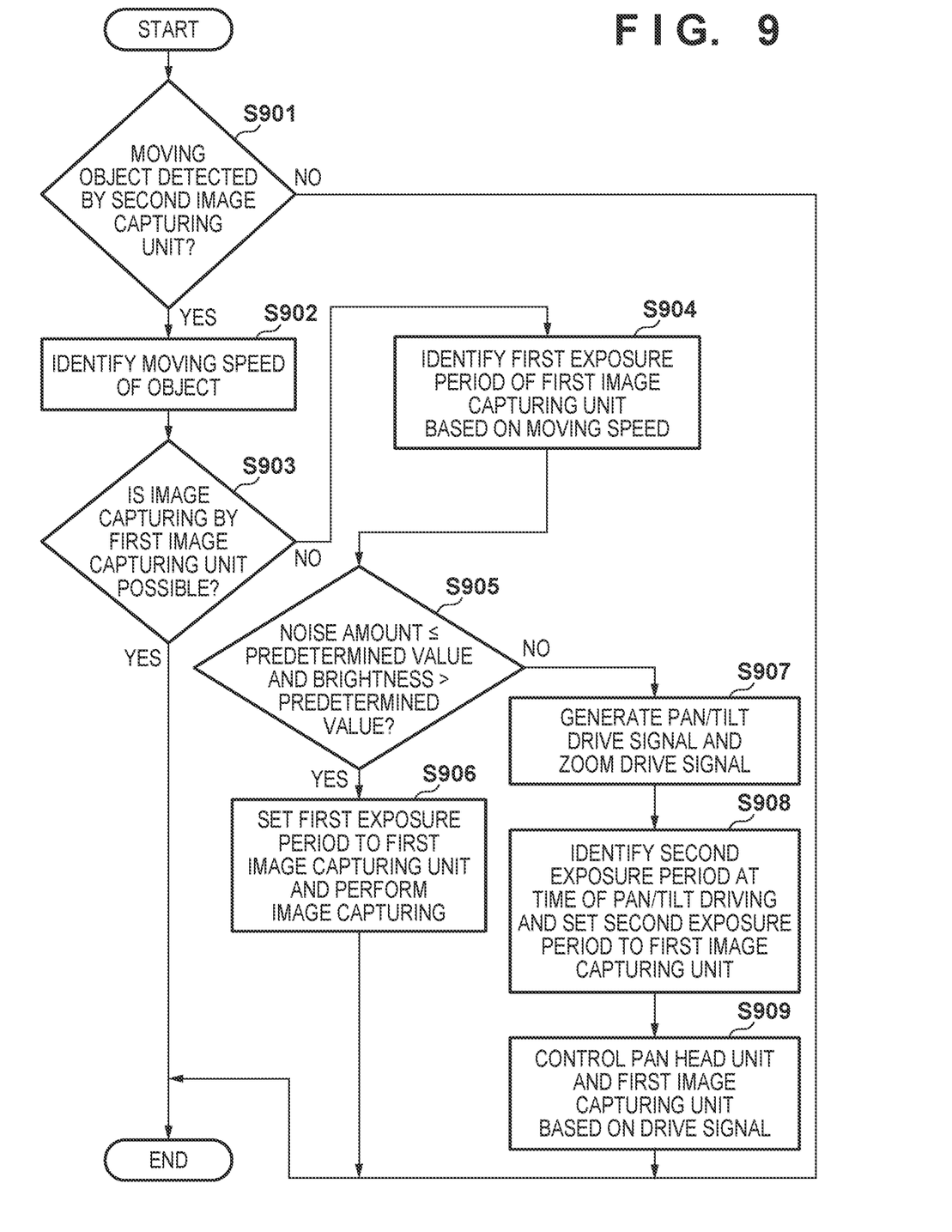
FIG. 9 is a flowchart showing the third example of the procedure of processing.

The procedure of processing executed by the first image capturing unit 801, the second image capturing unit 802, the pan head unit 803, and the control unit 102 according to this embodiment will be described next with reference to FIG. 9.

First, the control unit 102 determines whether a moving object is detected via the second image capturing unit 802 (step S901). At this time, the control unit 102 may detect and recognize only an object having a specific characteristic as a moving object by characteristic amount extraction or pattern recognition, and need not always define an object that does not have the characteristic as a detection target even if it moves. In addition, in a case in which the object passes through a predetermined position in an image captured by the second image capturing unit 802 or enters a predetermined region, the control unit 102 may detect the object as a moving object. Upon determining that a moving object is detected (YES in step S901), the control unit 102 identifies the moving speed of the detected moving object (step S902). Identifying the moving speed is performed as in the above-described embodiments.

The control unit 102 determines whether the first image capturing unit 801 can capture the moving object captured by the second image capturing unit 802 while satisfying a predetermined condition (step S903). For example, the control unit 102 receives information from the second image capturing unit 802 and determines whether the first image capturing unit 801 can capture the moving object detected by the second image capturing unit 802 by first image capturing using the current exposure period while satisfying a predetermined condition. Here, the information received from the second image capturing unit 802 can include, for example, the size and the moving speed of the moving object and the current image capturing conditions of the second image capturing unit 802 including the field angle and the exposure condition. However, the information is not limited to this, and may include other arbitrary parameters. Upon determining that the object can be captured by the first image capturing while satisfying the predetermined condition (YES in step S903), the control unit 102 directly causes the first image capturing unit 801 to continue the image capturing of the brightness by the first image capturing without executing subsequent processing. On the other hand, upon determining that the object cannot be captured by the first image capturing while satisfying the predetermined condition (NO in step S903), the control unit 102 identifies the first exposure period capable of capturing the moving object by the first image capturing unit 801 without an image blur (step S904). The control unit 102 estimates the noise amount and the brightness of the image in a case in which the first exposure period identified in step S904 is set, and third image capturing using automatic exposure control is performed, and determines whether the noise amount is a predetermined value or less and whether the brightness exceeds a predetermined value (step S905). If the noise amount is not more than a predetermined threshold, and the brightness is more than a predetermined threshold (YES in step S905), the control unit 102 sets the first image capturing unit 801 such that the third image capturing is performed using the first exposure period (step S906). Note that the processes of steps S901 to S906 are different from the processing according to the second embodiment in that the target of control performed in accordance with detection of the moving object by the second image capturing unit 802 is the first image capturing unit 801, but in other points, are the same as steps S301 to S303 and steps S501 to S503 in FIG. 5.

On the other hand, if the noise amount exceeds the above-described predetermined threshold, or the brightness is the predetermined threshold or less when the third image capturing is performed (NO in step S905), the control unit 102 generates a pan/tilt drive signal and a zoom drive signal to suppress the noise amount and ensure sufficient brightness (step S907). The pan/tilt drive signal is generated as in step S304 of FIG. 3 as a signal for making the image capturing range of the first image capturing unit 801 follow the moving object. In addition, the zoom drive signal is generated as a signal for causing the first image capturing unit 801 to capture the moving object such that, for example, the moving object has a predetermined recognizable size in a screen. Based on, for example, the size of the moving object and the information of the image capturing condition obtained from the second image capturing unit 802, the control unit 102 generates the zoom drive signal such that the size of the moving object captured by the first image capturing unit 801 falls within a predetermined range. After that, the control unit 102 decides the second exposure period to be set when controlling the first image capturing unit 801 and the pan head unit 803 based on each signal generated in step S907 and sets the second exposure period to the first image capturing unit 801 (step S908). This processing is the same as the process of step S505 in FIG. 5. After that, the control unit 102 controls the pan head unit 803 and moves the image capturing range of the first image capturing unit 801 based on the pan/tilt drive signal generated in step S907 and also performs zooming control of the first image capturing unit 801 by the zoom drive signal generated in step S907 (step S909). As a result, the image capturing unit 101 moves the image capturing range in accordance with the pan/tilt drive signal and performs image capturing using the second exposure period while performing zooming based on the zoom drive signal.

As described above, in this embodiment, a device (second image capturing unit) that detects a moving object and determines the moving speed is prepared separately from the first image capturing unit that captures the moving object, and setting control for image capturing by the first image capturing unit is performed in accordance with the detection result. Accordingly, setting preparation can be performed in advance, as compared to a case in which setting control is performed while performing image capturing. For this reason, even for a moving object that moves at a very high speed, appropriate setting can be prepared before the start of image capturing of the moving object. As a result, the period (for example, the exposure period) capable of performing image capturing can sufficiently be ensured, and the moving object can clearly be captured in various situations.

Note that the device that detects the moving object and determines the moving speed can be, for example, a sensor that measures a vehicle speed as general road equipment. For example, a method (photoelectric tube method or loop coil method) of measuring the moving speed based on the time to pass between proximity sensors installed at two points along the vehicle traveling direction or a method (radar method) of irradiating an object with a radar and measuring the time to return the radar wave reflected by the object can be used. The moving speed or the brightness value can also be obtained using another IoT sensor. Note that when an object that is not detected by the second image capturing unit is detected by the first image capturing unit, image capturing of the object by the first image capturing unit can be executed using the technique of the above-described first or second embodiment. That is, in this embodiment, the processing can be performed cooperatively by a plurality of image capturing units, or the processing can be completed using only one image capturing unit.

Other Embodiments

In the above explanation, an example in which a camera formed by an image capturing unit and a control unit is used has been described. However, the present invention is not limited to this. For example, the image capturing unit 101 and the control unit 102 may be formed as separate devices. For example, a system in which one control unit 102 that is connected to one or more image capturing units 101 and also collectively controls the image capturing units 101 exists may be formed. In addition, the control unit 102 may be formed by a plurality of devices and, for example, the above-described functional blocks or processing steps may be distributed to a plurality of devices and implemented. For example, a device that determines whether an object can be captured while satisfying a predetermined condition concerning quality in a state in which the image capturing range of the image capturing unit 101 is fixed may be implemented independently of the control unit 102 and the image capturing unit 101. The control unit 102 can obtain a determination result from the device without obtaining the moving speed of the object, thereby identifying whether the object can be captured while satisfying a predetermined condition concerning quality in a state in which the image capturing range of the image capturing unit 101 is fixed. At this time, the control unit 102 can receive a destination by, for example, a user operation and identify, based on only the information of a specific object in the obtained information, whether the object can be captured while satisfying a predetermined condition concerning quality in a state in which the image capturing range of the image capturing unit 101 is fixed. In this way, the above-described method can be applied in various forms.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-205546, filed Oct. 24, 2017, which is hereby incorporated by reference herein in its entirety.

What is claimed is:

1. A control apparatus comprising a computer executing instructions that, when executed by the computer, cause the computer to function as:
(1) a determination unit configured to determine, based on at least a moving speed of an object, whether a predetermined condition relating to image quality is satisfied in a case where an image capturing unit performs first image capturing for capturing the object without following the object; and
(2) a control unit configured to, in a case where it is determined that the predetermined condition is not satisfied by the first image capturing, control the image capturing unit to perform second image capturing for capturing the object while following the object.

2. The apparatus according to claim 1, wherein the instructions further cause the computer to function as a detection unit configured to detect the moving speed of the object,
wherein the determination unit determines, based on at least the moving speed detected by the detection unit, whether the predetermined condition is satisfied by performing the first image capturing.

3. The apparatus according to claim 1, wherein the determination unit determines that the predetermined condition is satisfied by performing the first image capturing in a case where the moving speed is not more than a predetermined threshold, and determines that the predetermined condition is not satisfied by performing the first image capturing in a case the moving speed exceeds the predetermined threshold.

4. The apparatus according to claim 1, wherein the determining unit determines, based on the moving speed and a current exposure period in the image capturing unit, whether the predetermined condition is satisfied by performing the first image capturing.

5. The apparatus according to claim 1, wherein in a case where the predetermined condition is not satisfied by performing the first image capturing, the determining unit determines whether a second condition relating to image quality is satisfied by performing third image capturing performed by setting a first exposure period corresponding to the moving speed to the image capturing unit, and
wherein in a case where the second condition is satisfied by the third image capturing, the control unit further performs control to set an exposure period of the image capturing unit to the first exposure period.

6. The apparatus according to claim 5, wherein in a case where the second condition is not satisfied by the third image capturing, the control unit performs the control to perform panning, tilting, or both panning and tilting of the image capturing unit.

7. The apparatus according to claim 6, wherein in a case where the second condition is not satisfied by the third image capturing, the control unit further performs control to set a second exposure period longer than the first exposure period to the image capturing unit.

8. The apparatus according to claim 5, wherein the second condition relates to brightness, a noise amount, or both the brightness and the noise amount of an image obtained by the third image capturing.

9. The apparatus according to claim 8, wherein in a case where the brightness exceeds a predetermined value concerning the brightness, and the noise amount is not more than a predetermined value relating to the noise amount, the determination unit determines that the second condition is satisfied by performing the third image capturing.

10. The apparatus according to claim 1, wherein the determination unit executes the determining for a designated object and does not execute the determining for an undesignated object.

11. The apparatus according to claim 10, wherein the determination unit designates an object that passes through a predetermined position in an image or an object that enters a predetermined region as the object to execute the determining.

12. The apparatus according to claim 10, wherein the determination unit designates an object selected by a user operation as the object to execute the determining.

13. The apparatus according to claim 1, wherein in a case where the predetermined condition is not satisfied by the first image capturing, the control unit performs the control to perform panning, tilting, or both panning and tilting of the image capturing unit.

14. The apparatus according to claim 13, wherein the control unit controls a pan head to which the image capturing unit is attached, thereby causing the pan head to perform panning, tilting, or both panning and tilting of the image capturing unit.

15. An image capturing apparatus comprising an image capturing unit and a control apparatus,
wherein the control apparatus comprises:
(1) a determination unit configured to determine, based on at least a moving speed of an object, whether a predetermined condition relating to image quality is satisfied in a case where an image capturing unit performs first image capturing for capturing the object without following the object; and
(2) a control unit configured to, in a case where it is determined that the predetermined condition is not satisfied by the first image capturing, control the image capturing unit to perform second image capturing for capturing the object while following the object.

16. A control method of a control apparatus, the control method comprising:
determining, based on at least a moving speed of an object, whether a predetermined condition relating to image quality is satisfied in a case where an image capturing unit performs first image capturing for capturing the object without following the object; and
in a case where it is determined that the predetermined condition is not satisfied by the first image capturing, controlling the image capturing unit to perform second image capturing for capturing the object while following the object.

17. A non-transitory computer-readable storage medium storing a computer program for causing a computer provided in a control apparatus to execute a method comprising:
determining, based on at least a moving speed of an object, whether a predetermined condition relating to image quality is satisfied in a case where an image capturing unit performs first image capturing for capturing the object without following the object; and
in a case where it is determined that the predetermined condition is not satisfied by the first image capturing, controlling the image capturing unit to perform second image capturing for capturing the object while following the object.

* * * * *